United States Patent [19]

Meyer

[11] Patent Number: 4,560,574

[45] Date of Patent: Dec. 24, 1985

[54] SALT SUBSTITUTE CONTAINING POTASSIUM CHLORIDE, MALTODEXTRIN AND SODIUM CHLORIDE AND METHOD OF PREPARATION

[75] Inventor: David R. Meyer, Chesterfield, Mo.

[73] Assignee: Mallinckrodt, Inc., St. Louis, Mo.

[21] Appl. No.: 509,849

[22] Filed: Jun. 30, 1983

[51] Int. Cl.$^4$ .............................................. A23L 1/237
[52] U.S. Cl. .................................... 426/649; 426/804
[58] Field of Search ................................ 426/649, 804

[56] References Cited

U.S. PATENT DOCUMENTS

| | | | |
|---|---|---|---|
| Re. 27,981 | 4/1974 | Frank et al. | 99/143 |
| 1,978,040 | 4/1933 | Daitz | 99/143 |
| 1,998,179 | 4/1935 | Wolf | 99/11 |
| 2,421,185 | 5/1947 | Comstock | 426/649 |
| 2,471,144 | 5/1949 | Davy | 426/649 |
| 2,596,333 | 5/1952 | Halpern | 426/649 |
| 2,742,366 | 4/1956 | Power | 99/143 |
| 3,197,277 | 7/1965 | Cooke | 426/649 |
| 3,505,082 | 4/1970 | Miller | 99/143 |
| 3,560,343 | 2/1971 | Armbruster et al. | 195/31 |
| 3,663,369 | 5/1972 | Morehouse et al. | 195/31 |
| 3,773,526 | 11/1973 | Bliznak | 426/215 |
| 3,821,436 | 6/1974 | Fry | 426/213 |
| 3,849,194 | 11/1974 | Armbruster et al. | 127/29 |
| 3,860,732 | 1/1975 | Eisenstadt | 426/219 |
| 3,860,735 | 1/1975 | Eisenstadt | 426/649 |
| 4,013,775 | 3/1977 | Nelson et al. | 426/285 |
| 4,068,006 | 1/1978 | Moritz | 426/99 |
| 4,107,346 | 8/1978 | Kravitz | 426/648 |
| 4,176,201 | 11/1979 | Cook | 426/548 |
| 4,298,400 | 11/1981 | Armbruster | 127/29 |
| 4,340,614 | 7/1982 | Pich et al. | 426/649 |

FOREIGN PATENT DOCUMENTS

| | | |
|---|---|---|
| 838060 | 3/1970 | Canada . |
| 1469089 | 3/1977 | United Kingdom . |
| 2080664 | 2/1982 | United Kingdom . |

OTHER PUBLICATIONS

"Maltrin(®) Maltodextrins . . . Carbohydrate Profile", Grain Processing Corporation, Bulletin 9102, 9/82, 4 pages.

"Maltrin Maltodextrins & Corn Syrup Solids", Grain Processing Corporation, Bulletin 11011, 11/81, 7 pages.

"Maltrin M100 Maltodextrin", Grain Processing Corporation, Product Data Sheet 6011, 6/81, one page.

Ser. No. 09844 Bell.

*Primary Examiner*—Raymond Jones
*Assistant Examiner*—Elizabeth A. King
*Attorney, Agent, or Firm*—Richard G. Jackson; Roy J. Klostermann; Lynden N. Goodwin

[57] ABSTRACT

A salt substitute composition is disclosed which includes a blend comprising:
(a) potassium chloride
(b) maltodextrin and
(c) sodium chloride.

In an embodiment, cream of tartar is further included in the salt substitute composition.

32 Claims, No Drawings

SALT SUBSTITUTE CONTAINING POTASSIUM CHLORIDE, MALTODEXTRIN AND SODIUM CHLORIDE AND METHOD OF PREPARATION

The present invention relates to a blend composition useful as a substitute for salt.

There are a number of salt substitute compositions which are described in the literature and/or are available commercially containing potassium chloride with and without sodium chloride. Such compositions have been proposed for people who seek to eliminate or minimize the amount of sodium chloride in their diet due to medical necessity or for other reasons. However, the heretofore known salt substitutes have not been entirely satisfactory from the standpoints of similarity to common salt (i.e. sodium chloride) in taste and appearance. Accordingly, there is a substantial need in the art for an improved salt substitute composition.

In U.S. patent application of Alexis D. Bell, Ser. No. 509,844, filed concurrently herewith (June 30, 1983) and assigned to the assignee hereof, there is described a salt substitute composition which comprises coated particles, each particle comprising:
(a) a core comprising potassium chloride and
(b) a coating on the core, the coating comprising a mixture containing
  (i) maltodextrin and
  (ii) sodium chloride,
wherein the dextrose equivalent (D.E.) of the combined amount of potassium chloride, maltodextrin and sodium chloride is not more than 10 D.E. units.

It has now been found unexpectedly that an effective salt substitute can be prepared in simple and efficient manner by admixing potassium chloride, maltodextrin and sodium chloride. Admixtures resulting from such admixing have unexpectedly been found to be effective salt-substitute compositions which at least closely approach common salt taste and appearance and substantially fulfill the above-mentioned need.

Surprisingly, it has now further been found that such admixtures with cream of tartar included as an additional component thereof more closely approach common salt in taste and more fully fulfill such need.

DESCRIPTION OF THE INVENTION

Generally stated, the present invention provides a salt-substitute blend composition which comprises a uniform admixture comprising:
(a) potassium chloride
(b) maltodextrin and
(c) sodium chloride,
wherein the dextrose equivalent (D.E.) of the combined amount of potassium chloride, maltodextrin and sodium chloride is not more than 10 D.E. units.

In an embodiment, the above salt substitute composition of this invention further includes cream of tartar. In this embodiment, the D.E. of the combined amount of potassium chloride, maltodextrin, sodium chloride and cream of tartar is preferably not more than 10 D.E. units.

DETAILED DESCRIPTION OF THE INVENTION AND OF THE MANNER AND PROCESS OF MAKING AND USING IT

As used herein with reference to a material, the terms "dextrose equivalent" and "D.E." mean the total amount of reducing sugars (calculated as dextrose) in the material, which amount is expressed as a percent of the total weight (dry basis) of the material. Such percent is referred to herein as "D.E. units." (Reducing sugars include, e.g., all monosaccharides; maltose; cellobiose; and lactose. Sucrose is a non-reducing sugar.) The D.E. of a material consisting of two or more components can be calculated by multiplying the weight fraction ("w.f.") of each component of the material by the D.E. of such component and adding the resulting products of multiplication. For example, a material consisting of 20% (0.20 w.f.) component A having a D.E. of 10 D.E. units and 80% (0.80 w.f.) component B having a D.E. of zero has a D.E. of 2 (0.20×10+0.80×0) D.E. units.

The salt substitute of the present invention contains three essential components, as indicated above. In general, these components may be combined in any relative proportions in accordance with the teachings hereof to prepare a broad range of salt substitutes useful for a wide variety of end use applications, e.g., for table salt, inclusion in snack foods (e.g., pretzels, potato chips, corn chips, etc.), cereals, baked goods and other edible compositions such as those which heretofore have included common salt (i.e., sodium chloride) as ingredients thereof. In use, the salt substitutes of the present invention may be substituted in whole or in part for the common salt component of heretofore known edible compositions.

The salt substitute may include the three essential components (see forth above) in the below indicated amounts:
potassium chloride: from about 91 to about 19%,
maltodextrin: from about 1 to about 40%, and
sodium chloride: from about 0.1 to about 75%,
wherein the percentage amounts are by weight based on the combined weight of such components.

As a general preference, the potassium chloride component is included in an amount from about 91 to about 20%, the maltodextrin component is included in an amount from about 10 to about 30%, and the sodium chloride component is included in an amount from about 1 to about 50%, wherein the percentage amounts are by weight based on the combined weight of the three essential components set forth above.

More preferably, the potassium chloride is included in an amount from about 85 to about 65%, the maltodextrin is included in an amount from about 15 to about 20%, and the sodium chloride is included in an amount from about 3 to about 15%, such percentages being by weight and on the aforesaid basis (i.e., the combined total weight of these three essential components being 100% by weight).

For human consumption of the salt-substitute compositions, all ingredients employed should be humanly edible, e.g., Food Chemical Codex grade.

Any suitable maltodextrin may be employed as the maltodextrin component. The maltodextrin employed is preferably a water-soluble maltodextrin having at least a major portion (e.g., slightly more than 50%, preferably about 60% or more) of one or more polysaccharides having a D.P. (i.e, degree of polymerization) of at least 10. More preferably, the maltodextrin employed is additionally a starch hydrolyzate of low sweetness having a low dextrose equivalent value of from about 5 to about 20 more preferably about 5 to about 15) D.E. units, high water solubility with substantial freedom from haze and low hygroscopicity. The most preferred maltodextrin employed herein is that commercially available from Grain Processing Corporation (GPC), Muscatine, Iowa, under the designation MALTRIN ® M100 maltodextrin. According to the "Typical Analysis" in GPC Bulletin 11011 entitled MALTRIN Maltodextrins & Corn Syrup Solids, M100 maltodextrin has a D.E. of about 9-12 D.E. units and a "Carbohydrate Composition, % (db)" as follows: dextrose (1.0), disaccharides (4.0), trisaccharides (6.0) and "tetrasaccharides & higher" (89.0). According to GPC Product Data Sheet 6011 for MALTRIN M100 maltodextrin, the M100 has a "Typical Carbohydrate Profile (dry basis) in % as follows: monosaccharides (1%), disaccharides (4%), trisaccharides (6%), tetrasaccharides (5%) and "pentasaccharides & above" (84%).

According to GPC Bulletin 9102 relating to "Carbohydrate Profile" of MALTRIN maltodextrins and corn syrup solids, M100 maltodextrin has the following "Typical Carbohydrate Profile":

| Saccharides-by Degree | Amount % | |
| of Polymerization | Average | Range |
| --- | --- | --- |
| DP1 | 0.5 | 0.3-0.8 |
| DP2 | 2.7 | 2.3-2.9 |
| DP3 | 4.3 | 4.2-5.0 |
| DP4 | 3.7 | 3.3-4.1 |
| DP5 | 3.1 | 2.7-3.4 |
| DP6 | 5.0 | 0.7-6.0 |
| DP7 | 7.1 | 6.5-8.3 |
| DP8 | 4.5 | 4.2-5.3 |
| DP9 | 3.1 | 2.8-3.6 |
| DP10 | 1.6 | 0.6-2.9 |
| Above DP10 | 64.4 | 56.8-68.1 |

The above GPC bulletins and data sheet are incorporated herein by reference.

Maltodextrins suitable for use herein may be prepared, for example, in accordance with the methods disclosed in U.S. Pat. Nos. 3,560,343; 3,663,369; 3,849,194; and 4,298,400. These patents are incorporated herein by reference.

Advantageously, the above-described salt-substitute compositions of the present invention further include cream of tartar in admixture with the three essential components. In any such embodiment cream of tartar can be included in any effective amount, that is, an amount such that the admixture more closely approaches common salt in at least one taste characteristic than a reference composition which is substantially the same as the admixture except not including the cream of tartar and including additional potassium chloride in an amount equal to the amount of cream of tartar. In general, such amount may be up to about 1% or more, based on the total weight of the four components.

The amounts of the components in these embodiments may be, for example:
potassium chloride: from about 91 to about 19%,
maltodextrin: from about 1 to about 40%,
sodium chloride: from about 0.1 to about 50%, and
cream of tartar: from about 0.1 to about 0.9%,
wherein the percentage amounts are by weight based on the combined weight of said components.

As a general preference, the potassium chloride component is included in an amount from about 91 to about 19%, the maltodextrin component is included in an amount from about 10 to about 30%, the sodium chloride component is included in an amount from about 0.1% to about 50%, and the cream of tartar component is included in an amount from about 0.1 to about 0.7%, wherein the percentage amounts are by weight based on the combined weight of the four components set forth above.

More preferably, the potassium chloride is included in an amount from about 85 to about 65%, the maltodextrin is included in an amount from about 15 to about 20%, the sodium chloride is included in an amount frm about 0.1 to about 15%, and the cream of tartar is included in an amount from about 0.1 to about 0.5%, such percentages being by weight and on the aforesaid basis (i.e., the combined total weight of these four components being 100% by weight).

Cream of tartar suitably included herein is commercially available from McCormick & Co. (Baltimore, Md. In general, cream of tartar is preferably included in an amount of about 0.33%.

The salt substitutes may be prepared from raw material ingredients having any suitable particle sizes. Each component may have a single particle size or may have a particle-size distribution, i.e, a range of particle sizes. The particle size or particle-size distribution of each component is preferably selected such that the resulting admixture of components is homogeneous and substantially free of segregation under storage and handling conditions. For best results, the potassium chloride particles generally have larger weight-average size than the weight-average size of the particles of each component other than potassium chloride.

As used herein, the term "particle" includes extremely small pieces of matter and small agglomerates or clusters thereof.

For example, good results have been obtained by admixing the following commercially available materials having the indicated typical particle-size distribution (in weight percent as a function of mesh size, U.S. Sieve, with a slash symbol (/) meaning "to"):

| Potassium Chloride ("Code 6842-Powder", Mallinckrodt, Inc. | | | | | |
| --- | --- | --- | --- | --- | --- |
| Mesh | +40 | −40/+60 | −60/+70 | −70/+100 | −100 |
| Wt. % | 0 | 18 | 16 | 33 | 33 |
| Maltodextrin (Maltrin ® M100, Grain Processing Corporation) | | | | | |
| Mesh | +40 | −40/+60 | −60/+80 | −80/+100 | −100/+140 | −140/+200 |
| Wt. % | 0 | 1 | 2 | 4 | 11 | 27 |
| Mesh | −200/+325 | −325 | | | | |
| Wt. % | 34 | 21 | | | | |
| Sodium Chloride ("Popcorn Salt", Diamond Crystal Co.) | | | | | |
| Mesh | +60 | −60/+80 | −80/+100 | −100/+140 | −140/+200 | −200 |
| Wt. % | 0.1 | 0.4 | 17.1 | 38.0 | 27.1 | 17.1 |

Improved results have been obtained by admixing the three material set forth immediately above with the following commercially available material having the indicated typical particle-size distribution (given on the above basis):

| Cream of Tartar, food grade (McCormick & Co.) | | | | |
|---|---|---|---|---|
| Mesh | +170 | −170/230 | −230/+325 | −235/+400 −400 |
| Wt. % | 0 | 3.3 | 7.1 | 8.9    80.7 |

Inspection of the above typical size-distribution data shows that typically 100% of Code 6842 potassium chloride will pass a 40-mesh screen, while 67% will so pass and be retained on a 100-mesh screen; 100% of Maltrin M100 maltodextrin will pass a 40-mesh screen, 97% will pass an 80-mesh screen, and 77% will pass an 80-mesh screen and be retained on a 325-mesh screen; 99.9% of such "Popcorn Salt" sodium chloride will pass a 60-mesh screen, 99.5% will pass an 80-mesh screen, and 82.4% will pass an 80-mesh screen and be retained on a 200-mesh screen; 100% of such cream of tartar will pass a 170-mesh screen, 96.7% will pass a 230-mesh screen, and 16% will pass a 230-mesh screen and be retained on a 400-mesh screen.

The particular size potassium chloride may be selected to meet any particular end use application. For example, where "pretzel grade" salt substitutes (i.e., plus 35 mesh U.S. sieve size) are desired, potassium chloride having a particle size greater than 35 mesh may be advantageously employed as the starting material. Where "shaker grade" (i.e., minus 35 to plus 60 mesh) is desired for the salt substitute, potassium chloride having a particle size from minus 35 to plus 60 mesh may advantageously be employed as the potassium chloride starting material. Where a "popcorn grade" (i.e., minus 60 mesh) size salt substitute is desired, the potassium chloride starting material may advantageously have a particle size of minus 60 mesh. The description set forth above regarding relative sizes of the components (i.e., potassium chloride particles having larger weight-average size) is applicable to such grades.

The salt substitutes of the present invention are preferably formulated as admixtures of very finely divided particles for use as all or part of the salt-flavor-producing component of such snack foods as potato chips, corn chips, popcorn and others which commonly employ salt powder as such component. As a general preference, all particles included in such admixtures will pass a U.S. Sieve 40-mesh screen and the potassium chloride particles will have larger weight-average size as set forth above.

The salt substitutes of the present invention are preferably prepared by thoroughly admixing the components as substantially dry solids to form a uniform admixture.

The as-produced salt substitutes may be used as is (with or without size classification) or, if desired, may be subjected to size reduction (e.g., crushing) prior to use.

Practice of the present invention is illustrated by the following nonlimiting examples. All parts and percentages given throughout this disclosure including the examples and claims appended hereto, are by weight unless otherwise indicated.

Unless otherwise indicated, the taste panel results set forth in the examples resulted from the following taste test procedure. Each panelist touched his tongue sequentially to each taste sample, which was supported on a clean paper napkin, made his taste evaluation, and rinsed his mouth with water prior to so tasting each sample. Each panel included at least three panelists. The evaluation or rating system is set forth herein below.

EXAMPLE 1

A composition of this invention containing potassium chloride, maltodextrin and sodium chloride was prepared in this example.

Maltodextrin M100 (Grain Processing Corporation), 20 parts ("MD"); potassium chloride (Code 6842—powder, Mallinckrodt, Inc.), 65 parts; and USP sodium chloride ("Popcorn Salt", Diamond Crystal Salt Co.), 15 parts, were thoroughly admixed as substantially dry solids at about 20°–25° C., thereby providing a particulate admixture which was substantially uniform throughout. Typical particle-size distributions of these commercially available materials are set forth above.

Based on method of preparation, the admixture contained about 65% KCl, about 20% maltodextrin ("MD") and about 15% NaCl.

Visual observation (without magnification) of the admixture showed that it was substantially identical in appearance to sodium chloride of like size. The admixture was found to be substantially free-flowing and substantially nonhygroscopic. Samples of the admixture composition were subjected to a taste test for evaluation thereof as a salt substitute. Samples of comparative materials were included in the test. Results of the test are set forth in Table I.

TABLE I
TASTE PANEL RESULTS

| Source of Taste Sample | Salti-ness | Bitter-Metallic | Cool-ing | After-taste | Sweet-ness |
|---|---|---|---|---|---|
| (I) Invention Example 1 Blend of: | 1.0 | 1.53 | 1.25 | 1.25 | 0.5 |
| KCl . . . 65% | | | | | |
| MD . . . 20% | | | | | |
| NaCl . . . 15% | | | | | |
| (II) Comparative Materials | | | | | |
| 20% NaCl + 80% KCl (b) | 1.0 | 3.0 | 3.0 | 3.0 | 0 |
| 50% NaCl + 50% KCl (b) | 1.13 | 2.75 | 1.75 | 2.25 | 0 |
| "Lite Salt" (c) (Morton Salt Co.) | 1.25 | 2.75 | 1.75 | 3.0 | 0 |
| Coated KCl-Containing Composition (d) | 1.25 | 0.63 | 0.63 | 0.63 | 1.0 |
| KCl . . . 65% (Core) | | | | | |
| MD . . . 20% (Coating) | | | | | |
| NaCl . . . 15% (Coating) | | | | | |
| Sodium Chloride ("7851 - Granular", Mallinckrodt, Inc.) | 1.0 | 0 | 0 | 0 | 0 |

(a) Each numerical result for each characteristic is the arithmetic average of each panelist's numerical rating made in accordance with the rating system set forth in Table II.
(b) 2-component mixtures within numerical range disclosed in Frank et al., U.S. Pat. Nos. 3,514,296 and Re. 27,981, each prepared by thoroughly admixing granular NaCl and granular KCl in the indicated proportions until a homogeneous product was attained.
(c) Analysis: 49.5% NaCl, 49.5% KCl, 1% other (including calcium silicate, magnesium carbonate, dextrose and potassium iodide).
(d) Prepared by spraying an aqueous solution containing 20 parts MALTRIN ® M100 maltodextrin ("MD"), 15 parts NaCl and approximately 60 parts water onto an agitated bed of KCl (Code 6307 - granular, Mallinckrodt, Inc.), 65 parts, maintained about 120° C. and continuing agitation at such temperature until the resulting coated particles were substantially dry.

TABLE II
RATING SYSTEM

| Meaning of Numerical Rating | Related Taste Characteristic | |
|---|---|---|
| | Saltiness | All others |
| 0 | Saltier than salt | None |
| 1 | High salt-like taste | Low |
| 2 | Medium salt-like taste | Medium |

TABLE II-continued

| RATING SYSTEM | | |
|---|---|---|
| Meaning of Numerical Rating | Related Taste Characteristic | |
| | Saltiness | All others |
| 3 | Low salt-like taste | High |
| 4 | No salt-like taste | Overwhelming |

As shown by the taste panel results in Table I, the salt-substitute admixture of the present invention illustrated by Example 1 has been found to closely approach the taste of common salt (sodium chloride) and more closely approach such taste than each of the other comparative materials set forth therein in at least one taste characteristic.

EXAMPLES 2 AND 3

The procedure of Example 1 was repeated in each of these examples except that the amounts of maltodextrin ("MD"), sodium chloride and potassium chloride were varied over the following ranges: 20–7.4 parts MD, 16–18.5 parts sodium chloride and 74.1–64 parts potassium chloride.

The approximate amounts of the components of the resulting particulate admixture compositions of Examples 2 and 3 are set forth below:

| Components | Approximate Amount of Components (%) | |
|---|---|---|
| | Ex. 2 | Ex. 3 |
| Potassium chloride | 64 | 74.1 |
| Maltodextrin | 20 | 7.4 |
| Sodium Chloride | 16 | 18.5 |

The results of visual inspection with respect to appearance relative to the appearance of sodium chloride were substantially the same for Examples 2 and 3 as for Example 1 above. The admixtures prepared in Example 2 and Example 3 were found to be substantially free-flowing and substantially non-hydroscopic. Samples of the compositions of Example 2 and Example 3 were subjected to a taste test for evaluation thereof as salt substitutes. Samples of comparative materials were included in the test. Taste panel itemized evaluations by taste category for Examples 2 and 3 appear in Table III, along with evaluations for the comparative materials.

TABLE III

| | TASTE PANEL RESULTS | | | | |
|---|---|---|---|---|---|
| | Taste Characteristics (a) | | | | |
| Source of Taste Sample | Salti-ness | Bitter-Metal-lic | Cool-ing | Af-ter-taste | Sweet-ness |
| (I) Invention | | | | | |
| Example 2 Blend of: | 1.0 | 0.38 | 0.63 | 0.5 | .5 |
| KCl ... 64% | | | | | |
| MD ... 20% | | | | | |
| NaCl ... 16% | | | | | |
| Example 3 Blend of: | 1.0 | 1.25 | 1.38 | 1.5 | .75 |
| KCl ... 74.1% | | | | | |
| MD ... 7.4% | | | | | |
| NaCl ... 18.5% | | | | | |
| (II) Comparative Materials | | | | | |
| Homogeneous Blends Prepared by Thoroughly Admixing the Indicated Ingredients in the Indicated Approximate Proportions (%) | | | | | |
| KCl/Dextrose/NaCl | | | | | |
| (1) 64  20  16 | 1.38 | 0.63 | 1.38 | 1.5 | 2.75 |
| (2) 78.4  2  19.6 | 1.38 | 2.5 | 2.0 | 3.0 | 1.0 |
| (3) 74.1  7.4  18.5 | 1.25 | 2.5 | 2.25 | 3.0 | 2.0 |

(a) Each numerical result for each characteristic is the arithmetic average of each panelist's numerical rating made in accordance with the rating system set forth in Table II.
NOTE:
(A) All samples have a KCl: NaCl weight ratio of 4:1.
(B) Comparative Material No. 2 has same D.E. (2 dextrose equivalent units) as that of Example 2.
(C) The blends in Example 2 and Example 3 were substantially homogeneous.

As shown by the taste panel results in Table III, the salt substitutes of the present invention illustrated by Examples 2 and 3 have been found to closely approach the taste of common salt (sodium chloride) and more closely approach such taste than the other comparative materials set forth therein in at least one taste characteristic.

EXAMPLE 4

A composition of this invention containing potassium chloride, maltodextrin ("MD"), sodium chloride and cream of tartar ("CT") was prepared in this example.

Maltodextrin M100 (Grain Processing Corporation) 20 parts ("MD"); potassium chloride (Code 6842—powder, Mallinckrodt, Inc.), 64.67 parts; USP sodium chloride ("Popcorn Salt", Diamond Crystal Salt Co.), 15 parts; and cream of tartar (food grade, McCormick & Co.), 0.33 part, were thoroughly admixed as substantially dry solids at about 20°–25° C., thereby providing a particulate admixture which was substantially uniform throughout. Typical particle-size distributions of these commercially available materials are set forth above.

Based on method of preparation, the admixture contained about 65% KCl, about 20% maltodextrin ("MD"), about 15% NaCl, and about 0.33% cream of tartar ("CT").

Visual observation (without magnification) of the admixture showed that it was substantially identical in appearance to sodium chloride of like size. The admixture was found to be substantially free-flowing and substantially nonhygroscopic. Samples of the admixture composition were subjected to a taste test for evaluation thereof as a salt substitute. Samples of comparative materials were included in the test. Results of the test are set forth in Table IV. This taste test was a portion of the taste test employed in Example 1.

TABLE IV

| | TASTE PANEL RESULTS | | | | |
|---|---|---|---|---|---|
| | Taste Characteristics (a) | | | | |
| Source of Taste Sample | Salti-ness | Bitter-Metal-lic | Cool-ing | Af-ter-taste | Sweet-ness |
| (I) Invention | | | | | |
| Example 4 Blend of: | 1.13 | 0.88 | 1.13 | 0.75 | 0.5 |
| KCl ... 64.67% | | | | | |
| MD ... 20% | | | | | |
| CT ... 0.33% | | | | | |
| NaCl ... 15% | | | | | |
| (II) Comparative Materials | | | | | |
| 20% NaCl + 80% KCl (b) | 1.0 | 3.0 | 3.0 | 3.0 | 0 |

TABLE IV-continued

TASTE PANEL RESULTS

| Source of Taste Sample | Taste Characteristics (a) | | | | |
|---|---|---|---|---|---|
| | Salti-ness | Bitter-Metal-lic | Cool-ing | Af-ter-taste | Sweet-ness |
| 50% NaCl + 50% KCl (b) | 1.13 | 2.75 | 1.75 | 2.25 | 0 |
| "Lite Salt" (c) (Morton Salt Co.) | 1.25 | 2.75 | 1.75 | 3.0 | 0 |
| Coated KCl-Containing Composition (d) KCl ... 65% (Core) MD ... 20% (Coating) NaCl ... 15% (Coating) | 1.25 | 0.63 | 0.63 | 0.63 | 1.0 |
| Sodium Chloride ("7851 - Granular", Mallinckrodt, Inc.) | 1.0 | 0 | 0 | 0 | 0 |

(a) Each numerical result for each characteristic is the arithmetic average of each panelist's numerical rating made in accordance with the rating system set forth in Table II.
(b) 2-component mixtures within numerical range disclosed in Frank et al., U.S. Pat. Nos. 3,514,296 and Re. 27,981, each prepared by thoroughly admixing granular NaCl and granular KCl in the indicated proportions until a homogeneous product was attained.
(c) Analysis: 49.5% NaCl, 49.5% KCl, 1% other (including calcium silicate, magnesium carbonate, dextrose and potassium iodide).
(d) Prepared by spraying an aqueous solution containing 20 parts MALTRIN ® M100 maltodextrin ("MD"), 15 parts NaCl and approximately 60 parts water onto an agitated bed of KCl (Code 6307 - granular, Mallinckrodt, Inc.), 65 parts, maintained about 120° C. and continuing agitation at such temperature until the resulting coated particles were substantially dry.

As shown by the taste panel results in Table IV, the salt-substitute admixture of the present invention illustrated by Example 4 has been found to closely approach the taste of common salt (sodium chloride) and more closely approach such taste than each of the other comparative materials set forth therein in at least one taste characteristic.

Comparison of the taste-characteristics ratings set forth in Table IV for the admixture of Example 4 with the taste-characteristics ratings set forth in Table I for the admixture of Example 1 shows that the admixture of Example 4 (including CT) was found to still more closely approach common salt in taste than the admixture of Example 1 (not including CT).

EXAMPLES 5-7

Additional admixture compositions of this invention containing potassium chloride, maltodextrin ("MD"), sodium chloride and cream of tartar ("CT") were prepared in these examples. The preparation procedure of Example 4 was repeated in each of these examples except that the amounts of potassium chloride, sodium chloride and cream of tartar added in forming the admixtures were as follows: Example 5—KCl (71.76 parts), NaCl (8 parts) and CT (0.24 part); Example 6—KCl (71.64 parts), NaCl (8 parts) and CT (0.36 part); and Example 7—KCl (75.62 parts), NaCl (4 parts) and CT (0.38 part).

Each of the resulting particulate admixtures was substantially uniform throughout.

Based on the method of preparation, the approximate amounts of the components in the compositions of Examples 5-7 are set forth below:

| Components | Approximate Amount of Components (%) | | |
|---|---|---|---|
| | Ex. 5 | Ex. 6 | Ex. 7 |
| Potassium chloride | 71.76 | 71.64 | 75.62 |
| Maltodextrin ("MD") | 20 | 20 | 20 |
| Sodium Chloride | 8 | 8 | 4 |
| Cream of Tartar ("CT") | 0.24 | 0.36 | 0.38 |

Visual observation (without magnification) of each admixture showed that it was substantially identical in appearance to sodium chloride of like size. Each admixture was found to be substantially free-flowing and substantially nonhygroscopic. Each admixture composition was tasted and found to closely approach common salt in taste. The admixture of Example 5 was found to more closely approach common salt from the standpoint of saltiness than the admixture of Example 7. The admixture of Example 6 was found to more closely approach common salt from such standpoint than the admixture of Example 5.

It is recognized that different end users may desire different levels of sodium chloride, and accordingly the best salt-substitute composition embodying this invention will depend on the desires of a given end user.

In general, regarding compositions of this invention not including cream of tartar, the salt substitute set forth in Example 1 above is contemplated to be the best embodiment from the standpoint of overall taste appeal, while the salt substitute set forth below is contemplated to be the best embodiment from the standpoint of commercial attractiveness:

| Component | Approximate Amount |
|---|---|
| Potassium Chloride | 72% |
| Maltodextrin M100 | 20% |
| Sodium Chloride | 8% |

In general, regarding compositions of this invention including cream of tartar (as usually preferred), the salt substitutes set forth as "A" and "B" below are contemplated to be the best embodiment from the standpoint of overall taste appeal and the best embodiment from the standpoint of commercial attractiveness, respectively:

| Component | Approximate Amounts (%) | |
|---|---|---|
| | "A" | "B" |
| Potassium Chloride | 71.67 | 75.67 |
| Maltodextrin M100 | 20 | 20 |
| Sodium Chloride | 8 | 4 |
| Cream of Tartar | 0.33 | 0.33 |

It is contemplated that carrying out production of large-scale (e.g., commercial-size) quantities of the salt substitute of the present invention can best be effected by admixing the components in a ribbon blender.

BEST MODE CONTEMPLATED

The best mode contemplated for carrying out this invention has been set forth in the above description, for example, by way of setting forth preferred materials and operating conditions, including but not limited to preferred ranges and values of amounts and other non-obvious variables material to successfully practicing the invention in the best way contemplated at the time of executing this patent application.

It is understood that the foregoing detailed description is given merely by way of illustration and that many modifications may be made therein without departing from the spirit or scope of the present invention.

What is claimed is:

1. A salt substitute composition which comprises a uniform admixture comprising as particulate components thereof:
(a) potassium chloride,
(b) maltodextrin and
(c) sodium chloride,
wherein (i) said components are present in the percentage amounts set forth:
potassium chloride: from about 91 to about 19%,
maltodextrin: from about 1 to about 40%, and
sodium chloride: from about 0.1 to about 75%,
the percentage amounts being by weight based on the combined weight of said components, and the (ii) dextrose equivalent (D.E.) value of the combined amount of potassium chloride, maltodextrin and sodium chloride is not more than 10 D.E. units.

2. The composition of claim 1 wherein said admixture is homogeneous.

3. The composition of claim 1 wherein the amounts of said components are as set forth:
potassium chloride: from about 91 to about 20%,
maltodextrin: from about 10 to about 30%, and
sodium chloride: from about 1 to about 50%.

4. The composition of claim 3 wherein the amounts of said components are as set forth:
potassium chloride: from about 85 to about 65%,
maltodextrin: from about 15 to about 20%, and
sodium chloride: from about 3 to about 15%.

5. The composition of claim 4 wherein the amount of potassium chloride is about 65%, the amount of maltodextrin is about 20%, and the amount of sodium chloride is about 15%.

6. The composition of claim 4 wherein the amount of potassium chloride is about 72%, the amount of maltodextrin is about 20% and the amount of sodium chloride is about 8%.

7. The composition of claim 1 wherein the average size of the potassium chloride particles is larger than both the average size of the maltodextrin particles and the average size of the sodium chloride particles.

8. The composition of claim 7 wherein:
(a) the potassium chloride has a particle-size distribution such that about 100% of the potassium chloride will pass a 40-mesh screen and about 67% will be retained on a 100-mesh screen;
(b) the maltodextrin has a particle-size distribution such that about 100% of the maltodextrin will pass a 40-mesh screen, about 97% will pass an 80-mesh screen and about 77% will pass an 80-mesh screen and be retained on a 325-mesh screen; and
(c) the sodium chloride has a particle-size distribution such that about 99.9% of the sodium chloride will pass a 60-mesh screen, about 99.5% will pass an 80-mesh screen and about 82.4% will pass an 80-mesh screen and be retained on a 200-mesh screen.

9. The composition of claim 1 wherein said maltodextrin is a water-soluble maltodextrin including as at least a major portion thereof one or more polysaccharides having a degree of polymerization (D.P.) of at least 10.

10. The composition of claim 9 wherein said maltodextrin is a starch hydrolyzate having a low dextrose equivalent (D.E.) value of from about 5 to about 20 D.E. units.

11. The composition of claim 10 wherein said maltodextrin has a D.E. in the range from about 5 to about 15 D.E. units.

12. The composition of claim 11 wherein said range is from about 9 to about 12.

13. The composition of claim 12 wherein said maltodextrin has the following saccharide content as determined by high performance liquid chromatography:

| Saccharides - by Degree | Amount | |
| of Polymerization | From About (%) | To About (%) |
| --- | --- | --- |
| DP1 | 0.3 | 0.8 |
| DP2 | 2.3 | 2.9 |
| DP3 | 4.2 | 5.0 |
| DP4 | 3.3 | 4.1 |
| DP5 | 2.7 | 3.4 |
| DP6 | 0.7 | 6.0 |
| DP7 | 6.5 | 8.3 |
| DP8 | 4.2 | 5.3 |
| DP9 | 2.8 | 3.6 |
| DP10 | 0.6 | 2.9 |
| DP (higher than 10) | 57 | 68 |

14. The composition of claim 13 wherein said saccharide content is as follows:

| Saccharides - by Degree of Polymerization | Amount (%) |
| --- | --- |
| DP1 | about 0.5 |
| DP2 | about 2.7 |
| DP3 | about 4.3 |
| DP4 | about 3.7 |
| DP5 | about 3.1 |
| DP6 | about 5.0 |
| DP7 | about 7.1 |
| DP8 | about 4.5 |
| DP9 | about 3.1 |
| DP10 | about 1.6 |
| DP (higher than 10) | about 64 |

15. The composition of claim 1 wherein said maltodextrin has a dextrose equivalent (D.E.) value of from about 5 to about 20 D.E. units.

16. A process for preparing a salt-substitute composition, said process comprising uniformly admixing potassium chloride, maltodextrin and sodium chloride, in amounts thereof such that the dextrose equivalent (D.E.) value of the combined amount of potassium chloride, maltodextrin and sodium chloride is not more than 10 D.E. units and (ii) based on said combined amount, the admixed amount of potassium chloride is from about 91 to about 19%, the admixed amount of maltodextrin is from about 1 to about 40% and the admixed amount of sodium chloride is from about 0.1 to about 75%, wherein each amount is by weight.

17. A salt substitute composition which comprises a uniform admixture comprising as particulate components thereof:
(a) potassium chloride,
(b) maltodextrin,
(c) sodium chloride and
(d) cream of tartar,
wherein (i) said components are present in the percentage amounts set forth:
potassium chloride: from about 91 to about 19%,
maltodextrin: from about 1 to about 40%, sodium chloride: from aout 0.1 to about 75%, and cream of tartar: from about 0.1 to about 0.9%, the percentage amounts being by weight based on the combined weight of said components, and (ii) the dextrose equivalent (D.E.) value of the combined amount of potassium chloride, maltodextrin, sodium chloride and cream of tartar is not more than 10 D.E. units.

18. The composition of claim 17 wherein said admixture is homogeneous.

19. The composition of claim 17 wherein the amounts of said components are as set forth:
potassium chloride: from about 91 to about 20%,
maltodextrin: from about 10 to about 30%,
sodium chloride: from about 1 to about 50%, and
cream of tartar: from about 0.1 to about 0.7%.

20. The composition of claim 19 wherein the amounts of said components are as set forth:
potassium chloride: from about 85 to about 65%,
maltodextrin: from about 15 to about 20%,
sodium chloride: from about 3 to about 15%, and
cream of tartar: from about 0.2 to about 0.5%.

21. The composition of claim 20 wherein the amount of potassium chloride is about 71.67%, the amount of maltodextrin is about 20%, the amount of sodium chloride is about 8% and the amount of cream of tartar is about 0.33%.

22. The composition of claim 20 wherein the amount of potassium chloride is about 75.67%, the amount of maltodextrin is about 20%, the amount of sodium chloride is about 4% and the amount of cream of tartar is about 0.33%.

23. The composition of claim 17 wherein the average size of the potassium chloride particles is larger than each of the following: the average size of the maltodextrin particles, the average size of the sodium chloride particles and the average size of the cream of tartar particles.

24. The composition of claim 23 wherein:
(a) the potassium chloride has a particle-size distribution such that about 100% of the potassium chloride will pass a 40-mesh sreen and about 67% will be retained on a 100-mesh screen;
(b) the maltodextrin has a particle-size distribution such that about 100% of the maltodextrin will pass a 40-mesh screen, about 97% will pass an 80-mesh screen and about 77% will pass an 80-mesh screen and be retained on a 325-mesh screen;
(c) the sodium chloride has a particle-size distribution such that about 99.9% of the sodium chloride will pass a 60-mesh screen, about 99.5% will pass an 80-mesh screen and about 82.4% will pass an 80-mesh screen and be retained on a 200-mesh screen; and
(d) the cream of tartar has a particle-size distribution such that about 100% of the cream of tartar will pass a 170-screen, about 96.7% will pass a 230-mesh screen and about 16% will pass a 230-mesh screen and be retained on a 400-mesh screen.

25. The composition of claim 17 wherein said maltodextrin is a water-soluble maltodextrin including as at least a major portion thereof one or more polysaccharides having a degree of polymerization (D.P.) of at least 10.

26. The composition of claim 25 wherein said maltodextrin is a starch hydrolyzate having a low dextrose equivalent (D.E.) value of from about 5 to about 20 D.E. units.

27. The composition of claim 26 wherein said maltodextrin has a D.E. in the range from about 5 to about 15 D.E. units.

28. The composition of claim 27 wherein said range is from about 9 to about 12.

29. The composition of claim 28 wherein said maltodextrin has the following saccharide content as determined by high performance liquid chromatography:

| Saccharides - by Degree | Amount | |
| of Polymerization | From About (%) | To About (%) |
| --- | --- | --- |
| DP1 | 0.3 | 0.8 |
| DP2 | 2.3 | 2.9 |
| DP3 | 4.2 | 5.0 |
| DP4 | 3.3 | 4.1 |
| DP5 | 2.7 | 3.4 |
| DP6 | 0.7 | 6.0 |
| DP7 | 6.5 | 8.3 |
| DP8 | 4.2 | 5.3 |
| DP9 | 2.8 | 3.6 |
| DP10 | 0.6 | 2.9 |
| DP (higher than 10) | 57 | 68 |

30. The composition of claim 29 wherein said saccharide content is as follows:

| Saccharides - by Degree of Polymerization | Amount (%) |
| --- | --- |
| DP1 | about 0.5 |
| DP2 | about 2.7 |
| DP3 | about 4.3 |
| DP4 | about 3.7 |
| DP5 | about 3.1 |
| DP6 | about 5.0 |
| DP7 | about 7.1 |
| DP8 | about 4.5 |
| DP9 | about 3.1 |
| DP10 | about 1.6 |
| DP (higher than 10) | about 64 |

31. The composition of claim 17 wherein said maltodextrin has a dextrose equivalent (D.E.) value of from about 5 to about 20 D.E. units.

32. A process for preparing a salt-substitute composition, said process comprising uniformly admixing potassium chloride, maltodextrin, sodium chloride and cream of tarter, in amounts thereof such that (i) the dextrose equivalent (D.E.) value of the combined amount of potassium chloride, maltodextrin, sodium chloride and cream of tarter is not more than 10 D.E. units and (ii) based on said combined amount, the admixed amount of potassium chloride is from about 91 to about 19%, the admixed amount of maltodextrin is from about 1 to about 40%, the admixed amount of sodium chloride is from about 0.1 to about 75%, and the admixed amount of cream of tartar is from about 0.1 to about 0.9%, wherein each amount is by weight.

* * * * *